United States Patent [19]

Haag

[11] Patent Number: 5,738,308

[45] Date of Patent: Apr. 14, 1998

[54] ION THRUSTER SUPPORT AND POSITIONING SYSTEM

[75] Inventor: Thomas W. Haag, N. Olmsted, Ohio

[73] Assignee: The United States of America as represented by the Administrator of the National Aeronautics and Space Administration, Washington, D.C.

[21] Appl. No.: 695,685

[22] Filed: Jun. 24, 1996

[51] Int. Cl.$^6$ .................................. B64G 1/26
[52] U.S. Cl. ...................... 244/169; 244/172; 244/54
[58] Field of Search ........................... 244/169, 172, 244/54, 52; 239/265.11, 265.19; 248/188.2, 649, 346.05

[56] References Cited

U.S. PATENT DOCUMENTS

| | | |
|---|---|---|
| 2,396,568 | 3/1946 | Goddard .................. 244/52 X |
| 2,825,514 | 3/1958 | Focke . |
| 3,073,630 | 1/1963 | Kuhn, Jr. .................. 244/52 X |
| 3,188,024 | 6/1965 | Schneider . |
| 3,662,973 | 5/1972 | Paine et al. ............... 244/169 X |
| 4,270,393 | 6/1981 | Osborne et al. . |
| 4,624,436 | 11/1986 | Cooney et al. . |
| 4,650,148 | 3/1987 | Sakamoto . |
| 4,759,503 | 7/1988 | Kraus et al. . |
| 4,913,379 | 4/1990 | Kubota et al. . |
| 4,951,521 | 8/1990 | Jacobson . |
| 4,955,559 | 9/1990 | Kaminskas .............. 244/172 X |
| 4,976,582 | 12/1990 | Clavel . |

Primary Examiner—William Grant
Attorney, Agent, or Firm—Kent N. Stone

[57] ABSTRACT

A system for supporting and selectively positioning an ion thruster (12) relative to a surface (14) of a spacecraft includes three angularly spaced thruster support assemblies (16, 17, 18). Each thruster support assembly includes a frame (20) which has a rotary actuator (42) mounted thereon. The rotary actuator is connected to an actuator member (36) which is rotatably connected to a thruster attachment member (19) connected to a body of the thruster. A stabilizer member (30) is rotatably mounted to the frame and to the thruster attachment member. The thruster is selectively movable in the pitch and yaw directions responsive to movement of the actuator members by the actuators on the thruster support assemblies. A failure of any one actuator on a thruster support assembly will generally still enable limited thruster positioning capability in two directions. In a retracted position the thruster attachment members are held in nested relation in saddles (26) supported on the frames of the thruster support assemblies. The thruster is securely held in the retracted position during periods of high loading such as during launch of the spacecraft.

23 Claims, 5 Drawing Sheets

ION THRUSTER SUPPORT AND POSITIONING SYSTEM

ORIGIN OF THE INVENTION

The invention described herein was made by an employee of the United States Government and may be manufactured and used by or for the Government for Government purposes without the payment of any royalties thereon or therefor.

TECHNICAL FIELD

This invention relates to spacecraft propulsion systems. Specifically, this invention relates to a system for supporting and positioning an ion thruster for the purpose of directing the propulsive force therefrom.

BACKGROUND ART

Thruster positioning mechanisms and systems are used on spacecraft for the purpose of directing the propulsive force from a thruster. Such systems are often used to align the thrust vector through the center of mass of the spacecraft to enable straight line acceleration. Vectoring of the thrust away from the center of mass is often done to initiate vehicle rotation or for course changing maneuvers. Such thrust vectoring is used to control the pitch and yaw rate of a spacecraft.

In the past, thruster positioning control systems have included various types of gimbal mechanisms. Conventional liquid fuel rocket motors use a universal joint axially aligned with the rocket motor. The universal joint is commonly located at the top of a propellant injector head. The universal joint transmits thrust to the spacecraft structure and enables the thrust to be selectively directed.

In the rocket motor gimbal mechanisms commonly used with liquid fuel rocket motors, thrust vectoring is controlled by two linear actuators that are oriented 90 degrees apart. These actuators operate to pivot the motor so as to vector the thrust in the desired direction relative to the spacecraft. This arrangement is simple and compact, and it has been used on liquid fuel rocket motors with high and low thrust levels.

While this rocket motor gimbal mechanism is satisfactory for use with liquid fuel systems, it is not suitable for use with some other types of thrusters. Specifically, ion thrusters have a configuration which is not generally suitable for axial type mounting. Ion thrusters typically have a hollow cathode assembly including a propellant feed tube and high voltage isolator located at the axial back center area of the thruster. These components are fragile and may be subject to damage if located in proximity to a main force bearing support such as a gimbal mechanism.

Ion thrusters also have a different weight distribution than some other types of thrusters. The heaviest components of an ion thruster are the ion optics. These are located near the thrust exit plane. Due to the large amount of mass located near the exit plane of the ion thruster, mounting the thruster with a conventional rear gimbal mechanism would result in the application of high forces and bending moments near the fragile components at the rear of the thruster. Due to the high vibrational loads encountered during a launch of a spacecraft, major structural modifications and heavy reinforcement structures would be required to achieve a satisfactory rear axial gimbal mount for an ion thruster.

Alternative gimbal mount designs have been developed to accommodate the features and weight distribution of ion thrusters. One such alternative gimbal construction is used on the NASA SERT II spacecraft. This design includes a concentric pivoting ring type mount similar to that commonly used in connection with gyroscope suspension applications. The concentric rings surround the mid-body of the thruster. The outer ring is constrained to rotate about a central axis and the inner ring is mounted to the outer ring and is constrained to rotate about an axis that extends 90 degrees to the rotational axis of the outer ring.

The concentric ring gimbal mount of the SERT II thruster has the desirable feature of supporting the thruster closer to its center of mass. The design further avoids the transmission of force through the fragile components at the rear axial center area of the thruster. Vectoring of the SERT II thruster gimbal is achieved by linear actuators which move the gimbal rings in the pitch and yaw directions.

A significant drawback of the pivoting ring gimbal mount used with the SERT II thruster is the poor ability of the ring members to resist twisting forces. This is a problem in holding the thruster in a secured position under the high load conditions which are encountered during launch of a spacecraft. To strengthen the gimbal mount in the SERT II, pyrotechnic pin pullers are used to hold the gimbal mechanism during launch. This added support holds the ring members in fixed position until the spacecraft reaches orbit. Once in orbit the pin pullers are fired enabling the ring members of the gimbal to move and the ion thruster to be selectively positioned.

The SERT II system has the drawback that the pivoting ring members are not sufficiently strong to withstand forces encountered during launch. Further, the use of pyrotechnic pin pullers to hold the ring members entails a risk that the ring members cannot be freed once the spacecraft has reached orbit. A further drawback associated with the SERT II gimbal mechanism is that there is only one actuator for each direction of movement for the gimbal mechanism. If either directional actuator fails the ability to selectively vector the thrust in two directions is lost.

An alternative thruster support and control system is used with the ion thrusters on NASA's SEPS and SIT-8. The ion thruster support control system used on these spacecraft includes a universal joint connected to one side surface of a thruster. A guide pin extends outward from a side of the thruster opposite the universal joint. The guide pin extends in a longitudinally extending slot.

A pair of linear actuators are attached to the thruster generally at opposed 140 degree angles from the universal joint. The linear actuators are selectively moved to vector the thrust in the pitch and yaw directions. The guide pin which is constrained to move in the slot provides lateral stability.

The SEPS thruster support control system has the advantage of supporting the thruster in the area adjacent to the ion optics. However the structure is somewhat bulky and moving the thruster to certain angular positions can be difficult. A drawback associated with the pin and guide slot construction is that the higher the maximum thrust vector angle the longer the guide slot is required to be. At maximum angular positions the slot may extend in the thrust beam creating erosion and back sputter problems. In addition, material and debris may accumulate in the slot which may result in sticking and difficulty in positioning the thruster to a desired angle.

Like the SERT II construction, the SEPS arrangement also presents the disadvantage that a failure of any one of the linear actuators results in loss of positioning capability of the thruster. Both linear actuators must be working properly in combination to achieve the desired movement of the thrust vector in the pitch and yaw directions.

Thus, there exists a need for an ion thruster support and positioning system that reliably positions an ion thruster, has the strength to withstand severe loading, is light in weight and which has redundant capabilities so as to maintain operability in the event of a partial failure.

DISCLOSURE OF INVENTION

It is an object of the present invention to provide a system for reliably supporting and selectively positioning a thruster on a spacecraft.

It is a further object of the present invention to provide a system for supporting and selectively positioning a thruster on a spacecraft that is light in weight.

It is a further object of the present invention to provide a system for supporting and selectively positioning a thruster on a spacecraft that holds the thruster in a secured retracted position to avoid unwanted movement thereof during heavy load conditions.

It is a further object of the present invention to provide a system for supporting and selectively positioning an ion thruster on a spacecraft that minimizes the risk of damage to thruster components.

It is a further object of the present invention to provide a system for supporting and selectively positioning an ion thruster on a spacecraft which provides redundancy in operative capability in the event of a failure.

It is a further object of the present invention to provide a system for supporting and selectively positioning a thruster on a spacecraft that accurately positions the thruster to vector the thrust in two directions.

It is a further object of the present invention to provide a system for supporting and selectively positioning a thruster on a spacecraft that is specifically suited to the construction and weight distribution of an ion thruster.

Further objects of the present invention will be made apparent in the following Best Modes for Carrying Out Invention and the appended claims.

The foregoing objects are accomplished in a preferred embodiment of the invention by a system for supporting and selectively positioning an ion thruster on a spacecraft. The system comprises at least three thruster support assemblies angularly spaced about the ion thruster. Each of the thruster support assemblies includes a generally A-shaped frame in supported connection with a surface of the spacecraft. A stabilizer member has a first end that is rotatably mounted to the frame. A second end of the stabilizer member disposed of the first end is rotatably attached to a thruster attachment member which extends from a body of the ion thruster.

The thruster support assembly further includes a movable actuator member. The actuator member includes a distal end that is rotatably mounted to the thruster attachment member. An actuator is in operative connection with the actuator member. The actuator is operable to selectively move the thruster attachment member and connected stabilizer member so as to selectively position the thruster attachment member relative to the surface of the spacecraft.

Each thruster support assembly is operative to move an associated thruster attachment member, which members are angularly spaced about the body of the thruster. By selectively moving the actuators the ion thruster and the thrust vector therefrom is accurately positioned in the pitch and yaw direction.

Each of the thruster support assemblies includes a saddle thereon. In a retracted position the associated thruster attachment member is accepted in nested relation in the saddle. The support assemblies thus secure the thruster attachment members which hold and prevent damage to the thruster during severe load conditions such as during launch of the spacecraft.

The three thruster support assemblies which independently move the thruster provide redundant limited positioning capability in the event of failure. Upon failure of the actuator on any one of the support assemblies, the remaining actuators are generally able to provide limited capability to position the thruster in both directions of movement. As a result, a failure of any one actuator will generally not totally disable the thruster positioning system.

BEST MODES FOR CARRYING OUT INVENTION

Figure 1:
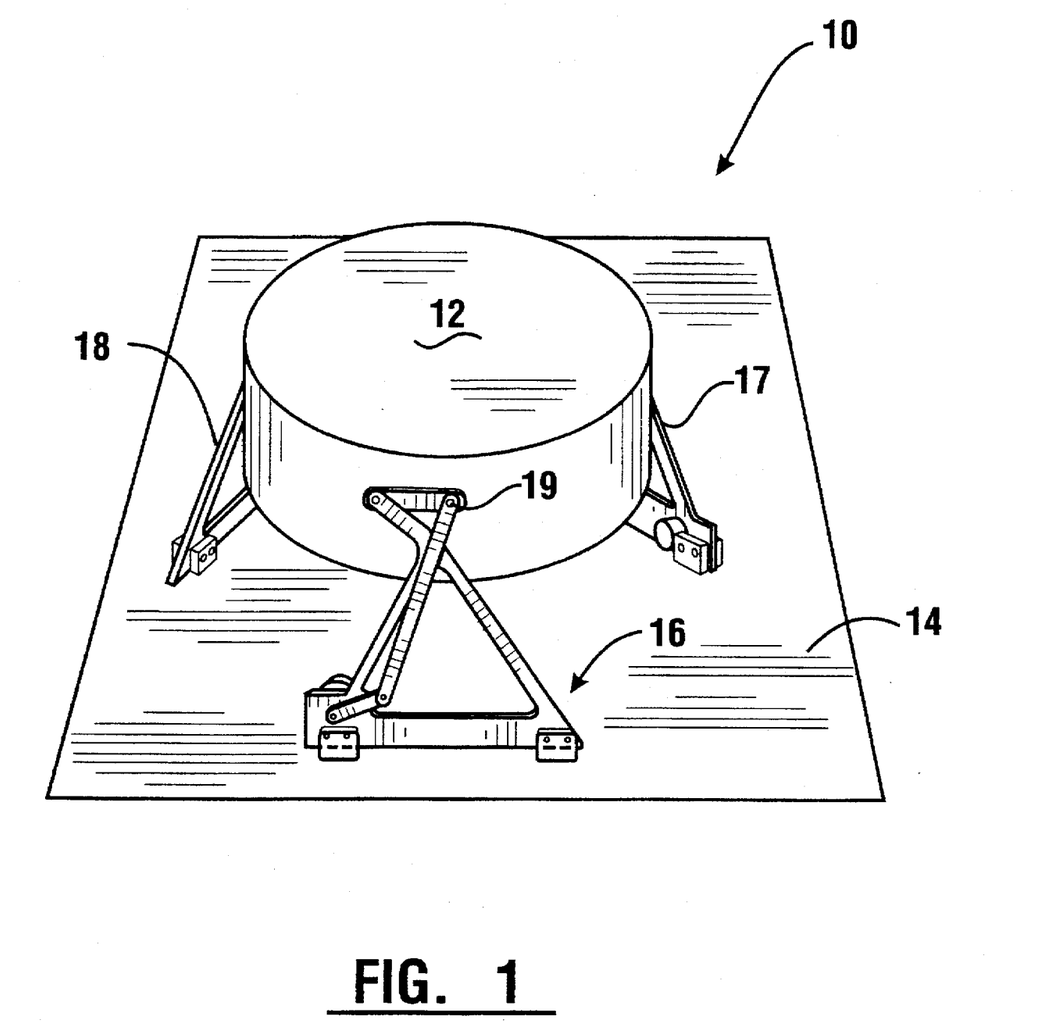
FIG. 1 is a front isometric view of an ion thruster and a support and positioning system of a preferred embodiment of the present invention.

Referring now to the drawings and particularly to FIG. 1, there is shown therein a preferred form of the thruster support and positioning system of the present invention generally indicated 10. The system is used to selectively position an ion thruster schematically indicated 12. Thruster 12 is preferably a conventional type of ion thruster, but may in other embodiments consist of a magnetoplasmadynamic thruster or a Hall effect device. The thruster 12 produces a thrust vector generally outward from the center thereof. The system of the present invention is operative to support and position the thruster relative to a surface 14 of a spacecraft.

Figure 2:
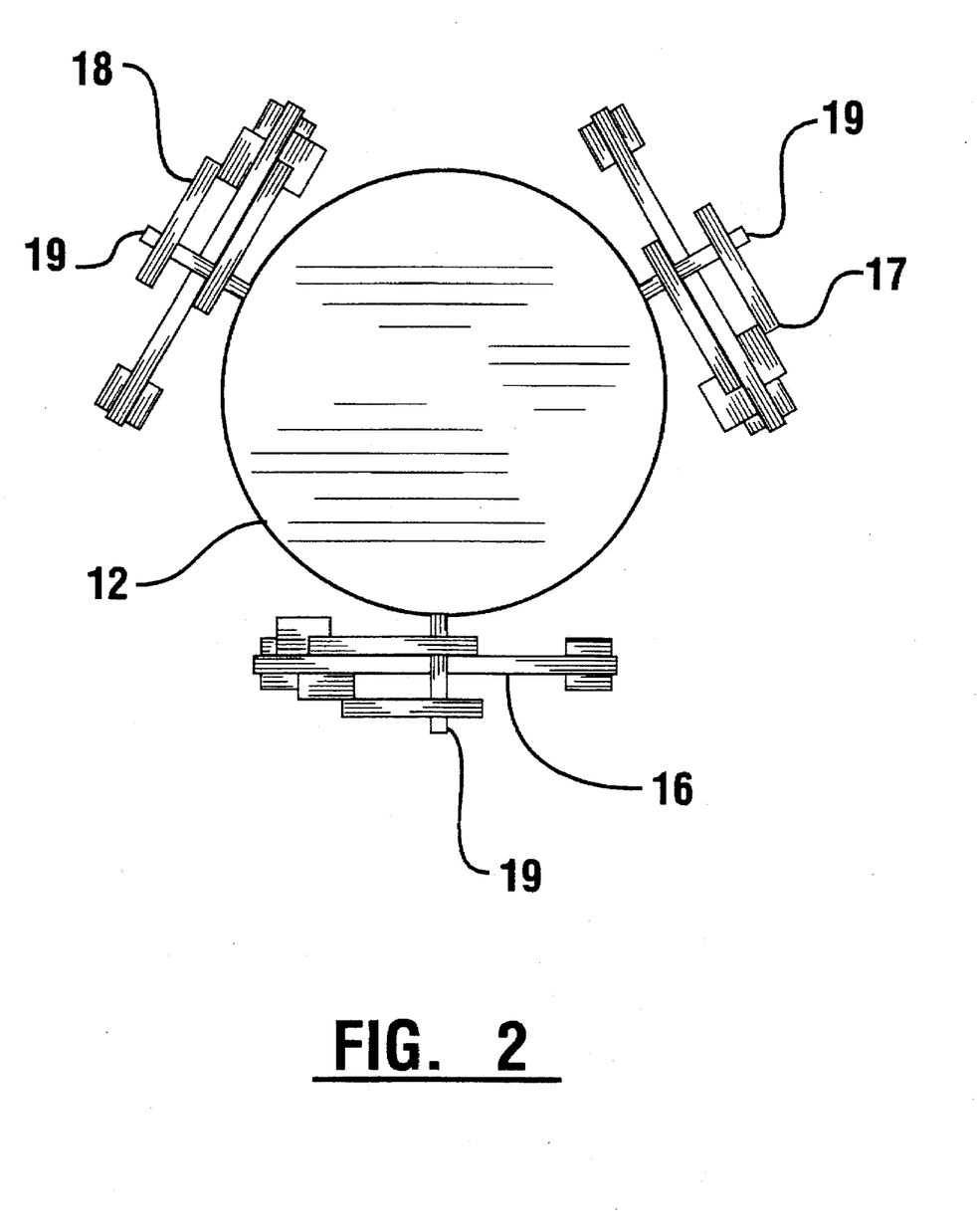
FIG. 2 is a top plan view of the ion thruster support and positioning system shown in FIG. 1.

Thruster 12 is movably supported on three thruster support assemblies 16, 17 and 18. As shown in FIG. 2 the thruster support assemblies are arranged at 120 degree angles about the thruster. Each thruster support assembly is connected to a thruster attachment member 19 which extends generally radially outward from a body of thruster 12.

The thruster attachment members 19 are preferably arranged to extend from the body of the thruster in the area of the ion optics which is the heaviest part of the thruster. Further in the preferred embodiment, the thruster attachment members are in the nature of pin type members so as to facilitate the selective movement and positioning of the ion thruster.

Figure 3:
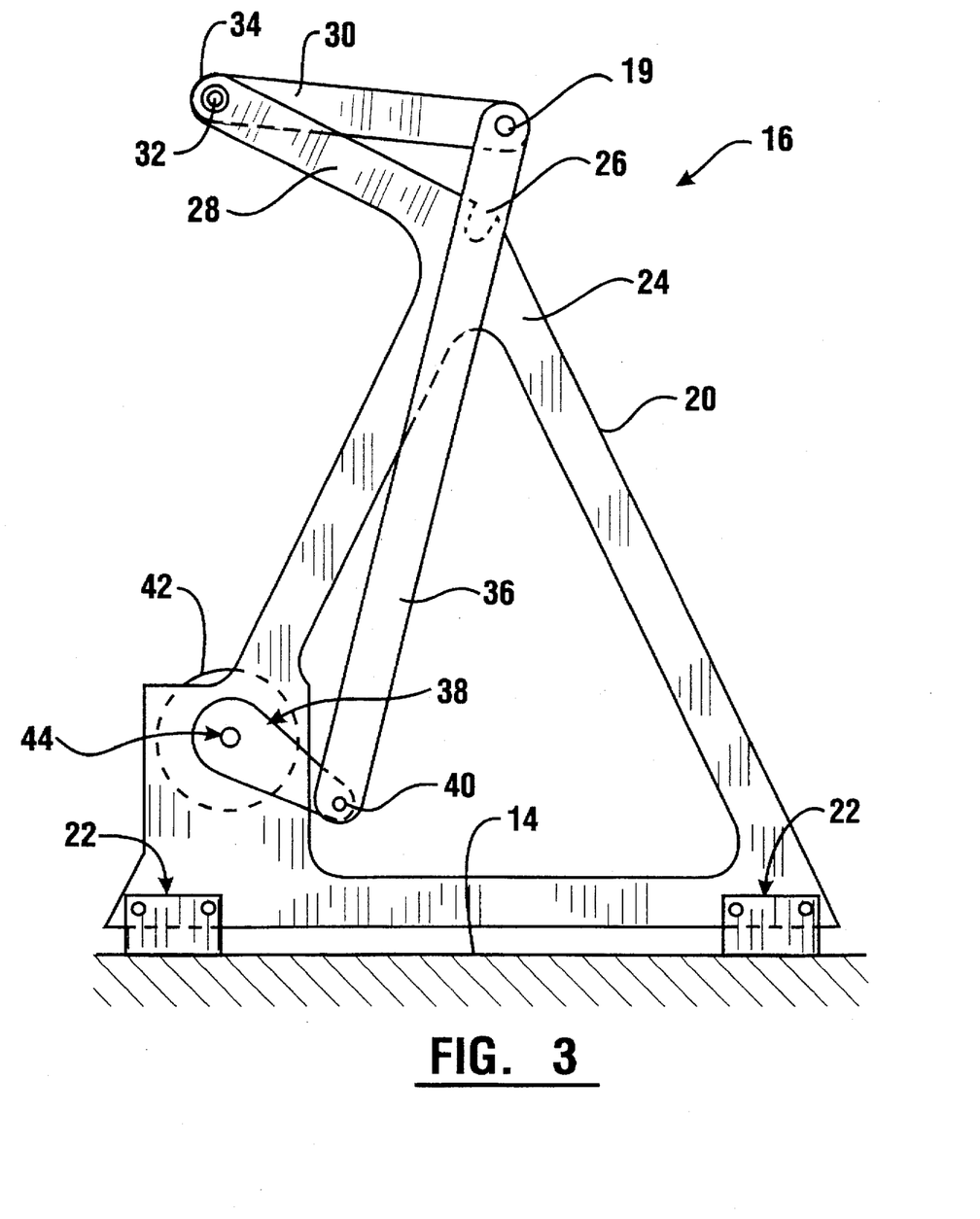
FIG. 3 is a front view of a thruster support assembly shown extended to a generally mid-range position.
Figure 4:
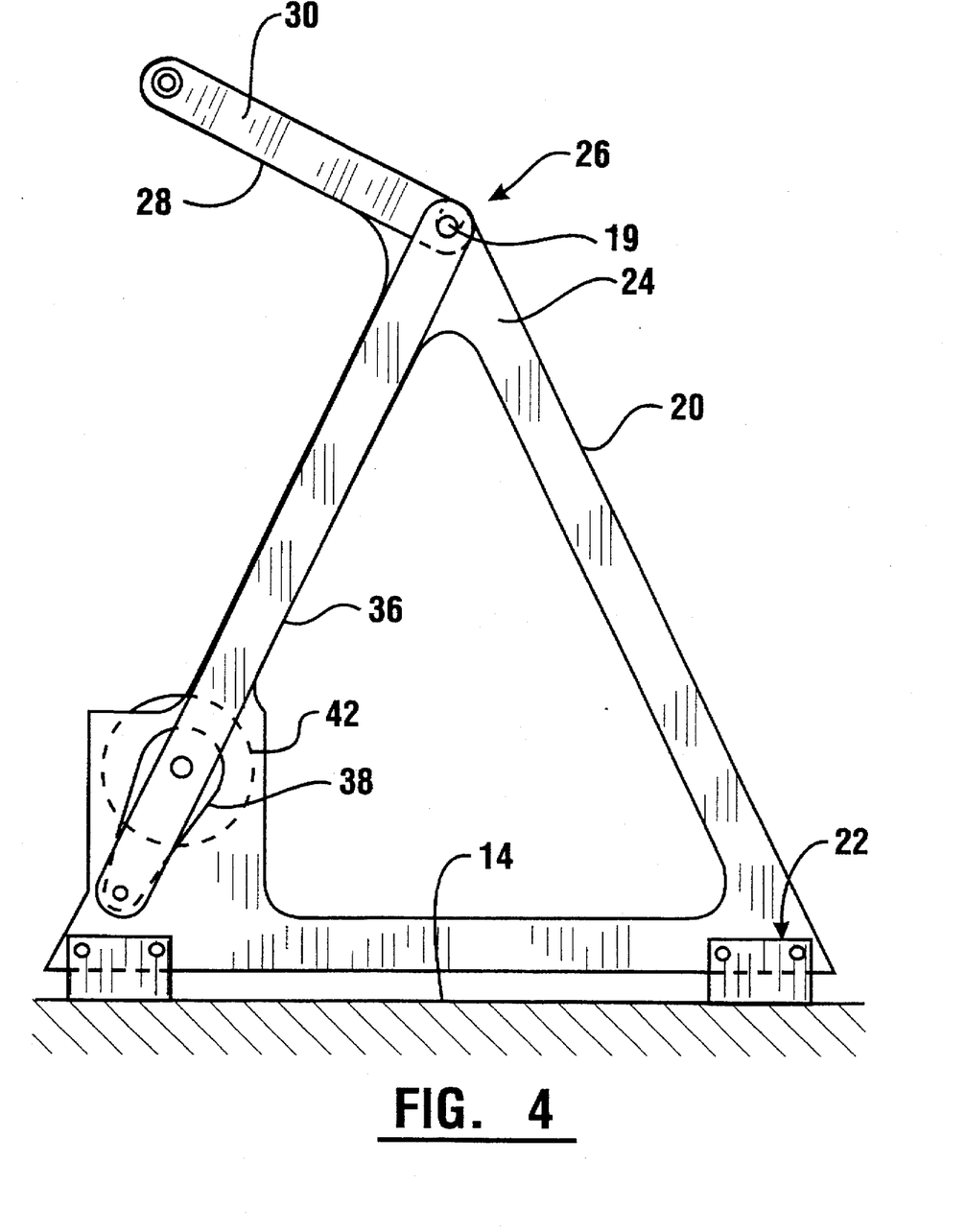
FIG. 4 is a front plan view of the thruster support assembly shown in FIG. 3 shown in a retracted position.

Thruster support assembly 16 used in the preferred embodiment of the thruster support positioning system of the present invention is shown in greater detail in FIGS. 3 and 4. Each of the thruster support assemblies 16, 17 and 18 are similar in construction so only one is described in detail.

The thruster support assembly includes a frame 20. Frame 20 is a generally triangular, A-shaped frame which extends in a single plane. Frame 20 is attached to spacecraft surface 14 by a pair of spaced flexural pivots 22. Flexural pivots 22 serve to connect frame 20 to the spacecraft surface and provide a limited amount of relative pivoting movement during thruster positioning.

Frame 20 of thruster support assembly 16 further includes an apex 24. A notch or saddle 26 is positioned adjacent to apex 24 on an outer surface of the frame. The purpose of the saddle 26 is later discussed in detail. Frame 20 further includes an extending portion 28. Extending portion 28 extends transversely from the apex 24 of the frame.

A stabilizer member 30 is rotatably mounted on frame 20. A first end of stabilizer member 30 is connected to extending portion 28 at a pivot 32. A second end of stabilizer member 30 is rotatably connected to thruster attachment member 19. It should be understood that the second end of the stabilizer member may include a rotatable ball type pivot bushing or other similar movable support for enabling attachment member 19 to both rotate and tilt relative to member 30. An electronic angular resolver 34 is mounted adjacent to pivot 32. Electronic angular resolver 34 is a part of the electrical control circuit for the thruster support and positioning system which is later discussed in detail.

Thruster support assembly 16 further includes an actuator member 36. Actuator member 36 has a distal end that is rotatably connected to thruster attachment member 19. The distal end of actuator member 36 also preferably includes a ball-type pivot bushing or similar movable support for enabling both rotational and tilting movement of member 19. A proximal end of actuator member 36 is connected to a crank arm 38. Crank arm 38 is connected to actuator member 36 by a pivot 40.

Crank arm 38 is rotationally movable by an actuator 42. Actuator 42 is supported on frame 20 and is operative to selectively rotate crank arm 38 through an actuator shaft 44. In the preferred form of the invention, actuator 42 is an electrical rotary actuator. However, in other embodiments of the invention, other types of rotary or linear actuators may be used for selectively moving actuator member 36.

As shown with reference to FIGS. 2 and 3, the actuators 42 on each of the thruster support assemblies 16, 17 and 18 are operable to selectively position thruster 12 and to vector the thrust emanating therefrom. Specifically with reference to FIG. 3, moving actuator 42 so as to rotate crank arm 38 in a counterclockwise direction moves the connected thruster attachment member 19 outward relative to spacecraft surface 14. Conversely, by rotating crank arm 38 in a clockwise direction, thruster attachment member 19 is moved closer to spacecraft surface 14. By selectively varying the relative distances of the three thruster attachment members from the spacecraft surface, the ion thruster 12 may be positioned at selected pitch and yaw angles to vector the thrust therefrom.

Figure 5:
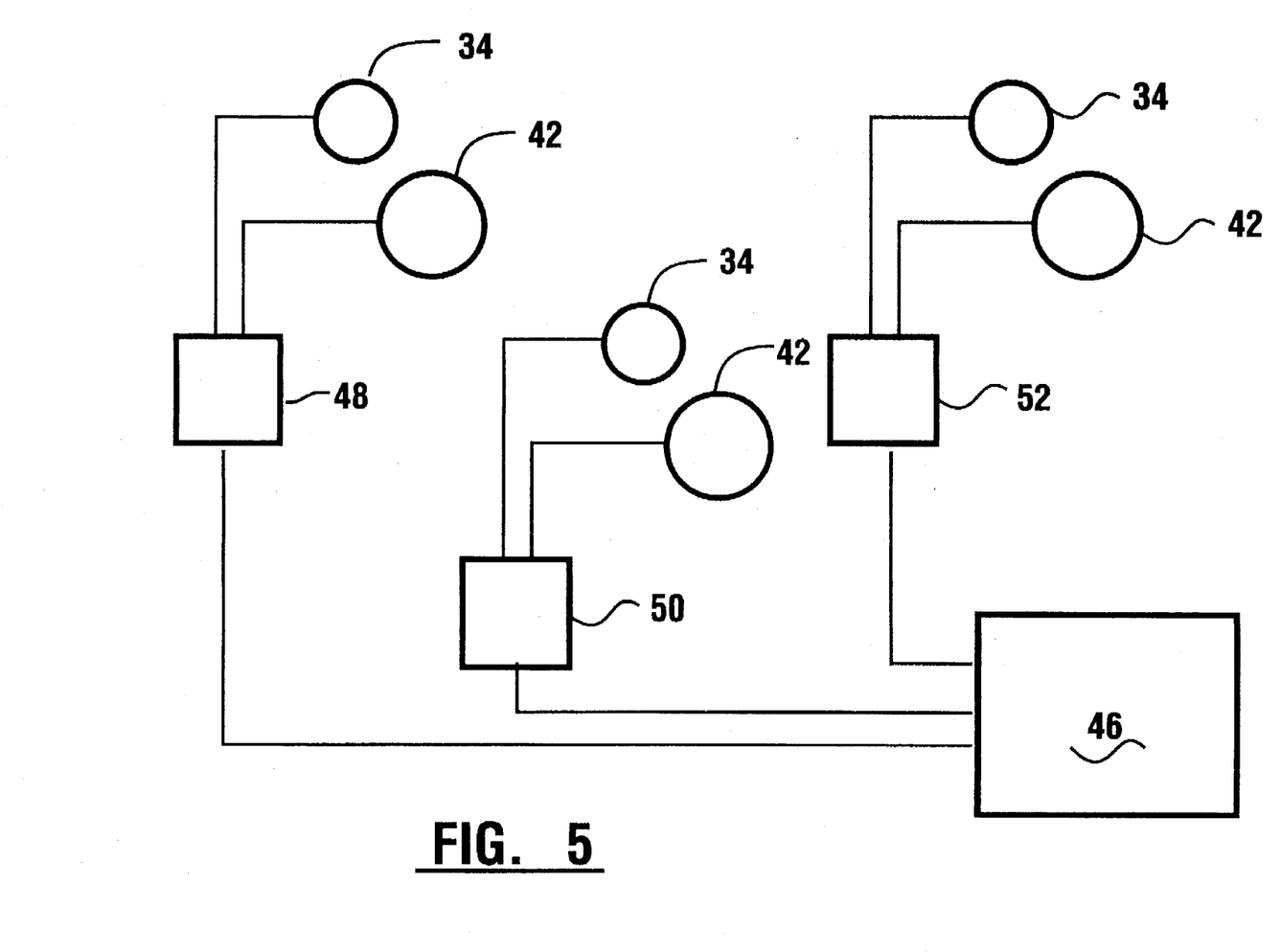
FIG. 5 is a schematic view of an electrical control circuit for the thruster positioning system.

The electronic control circuit of the thruster support and positioning system of the present invention is shown schematically with reference to FIG. 5. A controller generally indicated 46, is operative to control the thruster position. Controller 46 is operative to transmit signals representative of the desired positions of the thruster attachment members in connection with each of the support assemblies. Positioning signals are sent to positioning circuits 48, 50 and 52 associated with the first, second and third thruster support assemblies respectively.

In operation, each positioning circuit responds to the signals from controller 46 to move the associated rotary actuator 42 into a desired position. The proper positioning of the thruster attachment members is determined through feedback signals from the electronic angular resolver 34. The positioning circuits are operative to move the actuator on each thruster support assembly in a desired direction until the signal from the electronic angular resolver on the corresponding thruster support assembly matches that desired. The thruster support assembly remains in the desired orientation until moved again in response to signals from controller 46.

The thruster support and positioning system of the present invention has the added advantage that the ion thruster 12 may be moved into a retracted position. In the retracted position the thruster is solidly supported and held in a fixed position relative to each thruster support assembly. This minimizes the risk of damage to the thruster or the thruster support assemblies. In the retracted position of the thruster the entire assembly becomes rigidly locked together. In this position the risk of unwanted movement of the thruster induced by axial and lateral vibrational or other loading, such as encountered during spacecraft launch, is minimized.

The retracted position of the thruster is demonstrated with reference to FIG. 4. In the retracted position, the actuator 42 on each support assembly rotates crank arm 38 to the position shown in FIG. 4. In this position thruster attachment member 19 is brought adjacent to apex 24 of frame 20. As crank arm 38 is brought into aligned parallel relation with actuator member 36, thruster attachment member 19 is brought into nested relation with saddle 26. With the thruster attachment members held in the saddles of the support assemblies, unwanted movement of the thruster due to loading forces such as those encountered during launch conditions is avoided.

In the retracted position of the thruster support assembly the crank arm 38 and actuator member 36 are in aligned parallel relation. Likewise the extending portion 28 of the frame and the stabilizer member 30 are aligned in parallel relation. In this position the rotary actuator 42 is effectively isolated from longitudinal forces acting on the actuator linkage. While shear forces may act on the actuator shaft 44, no net torque can be applied to the actuator which could lead to unwanted movement of the actuator and premature release of the thruster attachment members from the saddles 26.

With the thruster in the retracted position lateral thruster loads are resisted by the U-shaped notches. Such loads are transferred to the spacecraft through the frames and flexural pivots attached to the spacecraft surface. During launch of the spacecraft, the thruster is oriented so that vibrational loads are generally applied as shear forces through the attachment points and are directed tangent to the thruster. The system of the invention minimizes distortion of the ion thruster body by minimizing radial forces which could press inwardly on the body of the thruster and cause damage. Further, the attachment points of the thruster to the thruster support assemblies are spaced about the center of mass of the thruster. This confines the maximum stress to a small portion of the overall body and enables a lighter overall thruster design by reducing the amount of reinforcing structures required.

The thruster support and positioning system is generally operative to retain the thruster in the secured and retracted position shown in FIG. 4 during launch and at other times of severe loading. Upon arrival in orbit the crank arm 38 of each support assembly is rotated in the counterclockwise direction as shown in FIG. 4, to move each thruster attachment member 19 from its saddle 26. With the attachment members removed from the saddles the entire assembly becomes more flexible. The actuators of the three thruster support assemblies 16, 17 and 18 are then moved under the control of controller 46 to position the ion thruster in the desired orientation for thrust vectoring. The frames 20 are enabled to move on the flexural pivots 22 so that the frames remain generally tangent to the thruster even when the thruster approaches extreme positions.

In the event of a malfunction of one of the three actuators, the thruster support and positioning system of the preferred embodiment of the invention is likely to maintain limited two direction positioning capability for the thruster. This is because only two operable thruster support assemblies are generally required to move the thruster in the pitch and yaw directions. If one thruster support assembly 16 fails with its associated actuator member intermediate of a fully extended or retracted position, the actuators on the other support assemblies can be operated to move the thruster in both the pitch and yaw directions. Of course the extent to which the thruster may be positioned may be limited depending on the position of the actuator member on the failed support assembly. Nonetheless, the ability of the support and positioning system of the present invention to maintain limited two direction thrust vectoring despite a total failure of one of the thruster support assemblies, provides a significant advantage not achievable with prior ion thruster positioning systems.

It should be understood that while three thruster support assemblies are shown angularly spaced equally about the body of the thruster, in other embodiments of the invention other numbers of support assemblies and angular positions may be used. Further, while the A-shaped frames of the preferred embodiment of the thruster support assemblies provide a significant strength to weight ratio, other embodiments may have thruster support structures having other configurations.

Thus, the new ion thruster support and positioning system of the present invention achieves the above-stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are for descriptive purposes and are intended to be broadly construed. Moreover, the descriptions and illustrations herein are by way of examples and the invention is not limited to the details shown and described.

In the following claims, any feature described as a means for performing a function shall be construed as encompassing any means capable of performing the recited function and shall not be deemed limited to the particular means shown for performing the function in the foregoing description, or mere equivalents.

Having described the features, discoveries and principles of the invention, the manner in which it is constructed and operated and the advantages and useful remits attained, the new and useful structures, devices, elements, arrangements, parts, combinations, systems, equipment, operations and relationships are set forth in the appended claims.

I claim:

1. A system for supporting and selectively positioning an ion thruster on a spacecraft, comprising:
    a frame in operative connection with said spacecraft;
    a thruster attachment pin member, wherein the thruster attachment pin member is in operative connection with a body of said thruster and extends in a generally radially outward direction relative to said body in the area of the ion optics of said ion thruster;
    a stabilizer member, said stabilizer member having a first end and a second end, wherein said first end is rotatably mounted in operative connection with said frame, and wherein said second end is rotatably mounted in operative connection with said thruster attachment pin member;
    a movable actuator member, wherein said actuator member includes a distal end, and wherein said distal end is in rotatably movable connection with said thruster attachment pin member; and
    an actuator in operative connection with said actuator member, and wherein said actuator is operative to selectively move said actuator member, whereby said actuator selectively moves said stabilizer member and said thruster attachment pin member to position said thruster relative to said spacecraft.

2. The system according to claim 1 wherein said frame comprises an extending portion, and wherein said first end of said stabilizer member is in rotatable operative connection with said extending portion.

3. The system according to claim 2 wherein said frame comprises an apex, and wherein said extending portion extends transversely from said apex.

4. The system according to claim 1 wherein said frame comprises an apex, and wherein said thruster attachment pin member is movable into adjacent relation with said apex.

5. The system according to claim 4 wherein said frame comprises a saddle and wherein said saddle is on said frame adjacent said apex, and wherein said thruster attachment pin member is movable into and out of nested relation in said saddle.

6. The system according to claim 1 wherein said frame is a generally planar frame.

7. The system according to claim 6 wherein said frame is a generally triangular shaped frame.

8. The system according to claim 7 wherein said actuator is mounted in supported relation of said frame, and wherein said frame is operatively connected to a surface of said spacecraft by two spaced flexural pivots.

9. The system according to claim 6 wherein said frame comprises an apex and wherein said frame further comprises an extending portion extending transversely from said apex, and wherein said stabilizer member is in rotatably movable operative connection with said extending portion, and wherein said thruster attachment pin member is movable to a retracted position adjacent said apex.

10. The system according to claim 1 wherein said actuator is in supported relation with said frame.

11. The system according to claim 1 wherein said frame is supported on a surface of said spacecraft by a flexural pivot.

12. The system according to claim 1 wherein said frame, stabilizer member, actuator member and actuator comprise a first support assembly, and wherein said system further comprises a second thruster attachment pin member in operative connection with said thruster, said second thruster attachment pin member disposed a distance away from said first thruster attachment pin member, and a second support assembly, and wherein said first support assembly is in operative connection with said first thruster attachment pin member and said second support assembly in operative connection with said second thruster attachment pin member, wherein said thruster is selectively positionable responsive to movement of said actuator members of said first and second support assemblies.

13. The system according to claim 12 and further comprising a third thruster attachment pin member in operative connection with said thruster, wherein said third thruster attachment pin member is disposed a distance away from said first and said second thruster attachment pin members, and further comprising a third support assembly wherein said third support assembly is in operative connection with said third thruster attachment pin member, wherein said thruster is selectively positionable responsive to movement of said actuator members on said first, second and third support assemblies.

14. The system according to claim 12 wherein said first and second thruster attachment pin members and said first and second support assemblies are angularly spaced about said thruster.

15. The system according to claim 1 wherein said frame, stabilizer member, actuator member and actuator comprise a support assembly, and wherein said system comprises a plurality of said thruster attachment pin members in operative connection with said thruster, and said system further, comprises a plurality of said support assemblies, wherein each support assembly is in operatively movable connection with one of said thruster attachment pin members.

16. A system for supporting and selectively positioning an ion thruster on a spacecraft, comprising:
   a frame in operative connection with said spacecraft;
   a saddle on said frame;
   a stabilizer member, said stabilizer member having a first end and a second end, wherein said first end is rotatably mounted in operative connection with said frame, and wherein said second end is rotatably mounted in operative connection with a thruster attachment member, wherein said thruster attachment member is in operative connection with said thruster;
   a movable actuator member, wherein said actuator member includes a distal end, and wherein said distal end is in rotatably movable connection with said thruster attachment member; and
   an actuator in operative connection with said actuator member, and wherein said actuator is operative to selectively move said actuator member, whereby said actuator selectively moves said stabilizer member and thruster attachment member to position said thruster relative to said spacecraft, and wherein the thruster attachment member is selectively movable into a nested relation in said saddle end out of said nested relation.

17. A system for supporting and selectively positioning an ion thruster on a spacecraft, comprising:
   a frame in operative connection with said spacecraft;
   a stabilizer member, said stabilizer member having a first end and a second end, wherein said first end is rotatably mounted in operative connection with said frame, and wherein said second end is rotatably mounted in operative connection with a thruster attachment member, wherein said thruster attachment member is in operative connection with said thruster;
   a movable actuator member, wherein said actuator member includes a distal end, and wherein said distal end is in rotatably movable connection with said thruster attachment member; and
   a rotary actuator;
   a crank arm in operative connection with said rotary actuator, wherein said crank arm is in operatively rotatably connected relation with said actuator member, and wherein selective movement of said rotary actuator is operative to selectively position said thruster relative to said spacecraft.

18. The system according to claim 17 and further comprising a saddle on said frame, and wherein in a retracted position said thruster attachment member is accepted in said saddle in nested relation, and said crank arm and said actuator member extend in generally parallel relation.

19. A system for supporting and selectively positioning an ion thruster on a spacecraft, comprising:
   a generally planar A-shaped frame in operative connection with said spacecraft;
   a stabilizer member, said stabilizer member having a first end and a second end, wherein said first end is rotatably mounted in operative connection with said frame, and wherein said second end is rotatably mounted in operative connection with a thruster attachment member, wherein said thruster attachment member is in operative connection with said thruster;
   a movable actuator member, wherein said actuator member includes a distal end, and wherein said distal end is in rotatably movable connection with said thruster attachment member; and
   an actuator in operative connection with said actuator member, and wherein said actuator is operative to selectively move said actuator member, whereby said actuator selectively moves said stabilizer member and thruster attachment member to position said thruster relative to said spacecraft.

20. A method for supporting and positioning an ion thruster relative to a spacecraft, comprising the steps of:
   providing a frame in operatively supported connection with a spacecraft;
   providing a thruster attachment pin member in operative connection with a body of said thruster, wherein the thruster attachment pin member extends in a generally radially outward direction relative to said body in the area of the ion optics of said ion thruster;
   connecting a stabilizer member in operatively rotatable connection with said frame and the thruster attachment pin member;
   connecting said thruster attachment pin member in rotatably movable connected relation with a movable actuator member; and
   selectively moving said actuator member with an actuator, whereby said thruster is selectively positioned relative to said spacecraft.

21. The method according to claim 20 wherein said frame comprises a saddle on said frame, and further comprising the step of moving said thruster attachment pin member from a first position disposed away from the saddle into a second position wherein said thruster attachment pin member is in nested relation in said saddle.

22. The method according to claim 20 wherein said frame, stabilizer member, actuator member and actuator comprise a support assembly, and wherein said method further comprises providing a second thruster attachment pin member operatively connected with said thruster and disposed a distance away from said first thruster attachment pin member, and providing a second support assembly in operative connection with said second thruster attachment pin member, and further comprising the step of selectively moving said second thruster attachment pin member with said second support assembly whereby said thruster is selectively positioned.

23. The method according to claim 20 wherein said frame, stabilizer member, actuator member and actuator comprise a support assembly and wherein said method further comprises providing a plurality of thruster attachment pin members in operative connection with said thruster and providing a plurality of said support assemblies to support said thruster, wherein each support assembly is in operatively supporting connection with one of said thruster attachment pin members, and further comprising the step of selectively moving each thruster attachment pin member with the respective support assembly, whereby said thruster is selectively positioned.

* * * * *